(12) United States Patent
Schulz

(10) Patent No.: US 6,185,538 B1
(45) Date of Patent: Feb. 6, 2001

(54) SYSTEM FOR EDITING DIGITAL VIDEO AND AUDIO INFORMATION

(75) Inventor: Axel Schulz, Bickenbach (DE)

(73) Assignee: US Philips Corporation, New York, NY (US)

( * ) Notice: Under 35 U.S.C. 154(b), the term of this patent shall be extended for 0 days.

(21) Appl. No.: 09/124,427

(22) Filed: Jul. 29, 1998

(30) Foreign Application Priority Data

Sep. 12, 1997 (DE) ............................................. 197 40 119

(51) Int. Cl.[7] ............................. G10L 15/26; G10L 15/22
(52) U.S. Cl. ........................... 704/278; 704/235; 704/276
(58) Field of Search .................................... 704/235, 200, 704/270, 272, 275, 276, 278

(56) References Cited

U.S. PATENT DOCUMENTS

| 5,561,457 | * | 10/1996 | Cragun et al. ...................... 348/13 |
| 5,634,020 | * | 5/1997 | Norton ................................. 395/339 |
| 5,911,129 | * | 6/1999 | Towell ................................. 704/272 |

FOREIGN PATENT DOCUMENTS

| 2096868A | 10/1982 | (GB) | ............................... G09G/1/16 |
| 09091928 | 4/1997 | (JP) | .............................. G11B/27/024 |
| WO9416443 | 7/1994 | (WO) . | |
| WO9825216 | 6/1998 | (WO) | .............................. G06F/17/30 |
| WO 98/25216 | * | 6/1998 | (WO) | .............................. G06F/17/30 |

* cited by examiner

Primary Examiner—Richemond Dorvil
(74) Attorney, Agent, or Firm—Gregory L. Thorne

(57) ABSTRACT

A system for non-linearly editing video and audio information, uses a device for recognizing speech in the audio information and for generating a character sequence, particularly an ASCII character sequence, to produce an edit decision list (EDL). The generated character sequence is displayed on the display screen of an indicator. With reference to marked parts of the character sequence displayed on the display screen of the indicator, editing data is derived for the EDL.

9 Claims, 2 Drawing Sheets

SYSTEM FOR EDITING DIGITAL VIDEO AND AUDIO INFORMATION

BACKGROUND OF THE INVENTION

The invention relates to a system for editing digital video and audio information, comprising: a storage means for recording and reproducing video and audio information, an indicator means for indicating information, a means for realizing an edit decision list comprising editing data, and a control means for controlling the storage means in dependence upon the editing data of the edit decision list.

In television studios, non-linear editing systems are increasingly used for producing programs suitable to be broadcast. In such editing systems, the signals of the video and audio information are initially stored in an unarranged form in a random access memory, for example, a disc memory. Subsequently, given image scenes (takes) of the stored video and audio information can be non-linearly accessed, i.e. without any time delay. It is conventional practice to determine also the editing instants with reference to the video and audio information stored in the memory, i.e. the instants of starting and ending each take which are to be broadcast. The editing instants of the selected takes, as well as the sequence of the takes are entered on an Edit Decision List (EDL). The editing data entered on the EDL are used for controlling the (disc) memory. In conformity with the editing data of the EDL, a continuing video/audio sequence suitable to be broadcast can be read from the memory. In contrast to the linear (sequential) magnetic tape technique, such a non-linear editing system allows an on-line check of the video/audio sequence composed on the basis of an EDL. In a non-linear editing system, EDL entries can be changed easily.

The editing instants cannot only be determined by means of the displayed images of the video material but also by means of the accompanying sound. The audio information, which is provided time-parallel with the video material, is then monitored and editing marks are inserted at the edit starts and edit ends of given takes which are about to be broadcast. This type of editing is suitable for producing current news broadcasts because the editing instants of the takes which are about to be broadcast can be determined more rapidly and more exactly with the aid of the audio information than with the aid of the image information of the video material.

A system for computer-aided editing of audio data is known from WO 94/16443, in which a part of the amplitude variation of the audio data is displayed on a monitor. Sound or speech interruptions which may serve as editing instants for editing marks are determined by means of glitches in the amplitude curve. The realization and evaluation of amplitude curves with reference to audio data requires a lot of feeling and special expertise. Consequently, this system is not very appropriate for editing current (television) news contributions by editors who have not had a technical training.

SUMMARY OF THE INVENTION

It is an object of the present invention to provide a system for editing digital video and audio source information as described in the opening paragraph, allowing easy, rapid and precise editing.

According to the invention, this object is solved by a means for recognizing speech in the audio information and for generating a character sequence, particularly an ASCII character sequence, which corresponds to said speech as a function of time, for display on a display screen of the indicator means, and a means for deriving editing data with reference to marked parts of the character sequence displayed on the display screen of the indicator means.

The invention has the advantage that current (television) news broadcasts, which usually comprise mainly spoken texts, can now be edited more rapidly and more precisely with respect to time as compared with the prior art. The basis for editing is no longer the image information of the video source material or the information of the audio source material reproduced through a loudspeaker, but a text derived by speech recognition from the audio data sequence of the audio source material and displayed on the screen of a display device. The sequence of words in the text displayed is coupled, as a function of time, with the sequence of images, because the image and sound information of a news contribution is generally recorded and stored simultaneously. The storage location of the image and sound information on the recording medium is fixed by means of a time code. Thus, a given time code value of the time code is assigned to each word in the displayed text, which time code value can be used advantageously in the realization of the EDL.

In accordance with a further embodiment of the invention, marks defining limits of parts of the character sequence displayed on the display screen of the indicator means are provided so as to fix an edit start and/or edit end. Another embodiment of the invention comprises a means for fixing the position of the limits of the marked parts of the character sequence displayed on the display screen of the indicator means, and a means for converting the position of the limits of the marked parts to time code data assigned to the video and audio information and for taking over the time code data as editing data in the edit decision list.

The position of the marks in the displayed text corresponds to a given time code value. The mark-defined limits (edit start, edit end) of a selected take represent given time code values of the edit start and the edit end. A mouse is provided to shift the position of the marks on the display screen. The mouse-clicked mark position is converted to the time code data assigned to the video and audio material and entered in the EDL.

The composition of the EDL according to the invention does not require a trained cutter. When technical or artistic viewpoints do not play a role, as is usually the case when a current news broadcast is compiled, a journalist can now also directly realize the EDL for his news contribution and immediately check and possibly change the editing results before his contribution is broadcast.

A further embodiment of the invention is characterized in that the display screen of the indicator means is implemented as a screen which can be touched to fix the position limits of given parts in the displayed character sequence. By fingertip-touching the start of a sentence or the end of a sentence in the displayed text, the relevant time code data can be taken over in the EDL without having to use a mouse for shifting a mark and confirming the entry.

Television news topics presented by foreign agencies or broadcasting stations and transmitted via satellites to television home stations are often available in a language which is not commonly used in the home country. The news material received is to be processed in the home studio, i.e. the spoken texts in the received audio material are to be translated and must replace the original audio parts. Alternatively, before the received news material is broadcast, it can be commented upon in the national language by a studio speaker.

Such an accompanying sound added to the image material can also be subjected to a speech recognition so as to realize an edit decision list with the aid of the text obtained. This method has the advantage that an ASCII text file generated by means of speech recognition can also be used for controlling a teleprompter for the commentator. By changing the audio pitch, the required (lip) synchronicity may be restored at different lengths of the audio and video takes, with the defined editing marks serving as reference points.

The ASCII character sequence remaining after the editing operation may be further utilized for necessary documentation purposes.

A further embodiment of the invention is characterized in that the speech-recognition means comprises a device for recognizing different voices in the spoken audio information, which device assigns a given character font to each voice so as to distinguish it from other voices. Passages in the displayed text originating from different speakers can thus be assigned to a given (female or male) speaker by way of a corresponding implementation of the characters, for example in a character font or character color. The displayed text can thus be imitated as the text of a scenario for several speakers.

A further embodiment of the invention is characterized in that, in addition to characters of the generated character sequence, also the characters of temporarily assigned images of the stored video information are displayed on the display screen of the indicator means. In particular, a plurality of single images of the stored video information is displayed on the display screen of the indicator means, whose time code data correspond, as a function of time, to time code data at the limits of marked parts of the displayed character sequence so as to define the edit starts and/or edit ends of selected takes.

It is furthermore advantageous that one or more inserts bounded by editing marks can be coupled, as a function of time, with a total broadcast time indicated on the display screen so as to display a remaining broadcast time, in order that, for example a commentator can estimate how much time he has left for his commentary.

These and other aspects of the invention are apparent from and will be elucidated with reference to the embodiments described hereinafter.

BRIEF DESCRIPTION OF THE DRAWINGS

Identical parts in the Figures have the same reference numerals.

DETAILED DESCRIPTION OF THE PREFERRED EMBODIMENTS

A television contribution suitable for broadcasting consists of a sequence of individual takes. The time sequence of the takes is fixed by an editor (cutter) who views the source material and selects given takes in the source material for later broadcasts. In order that the selected takes are broadcast in the sequence desired by the editor, an editing data list is to be set up, which is referred to as Edit Decision List (or EDL for short). An EDL-controlled editing system subsequently reads on-line the source material stored in a random access memory. The EDL described hereinafter is not fixed in a given EDL format. The EDL may be in one of the known EDL formats for example CMX, GVG, SONY.

Figure 1:
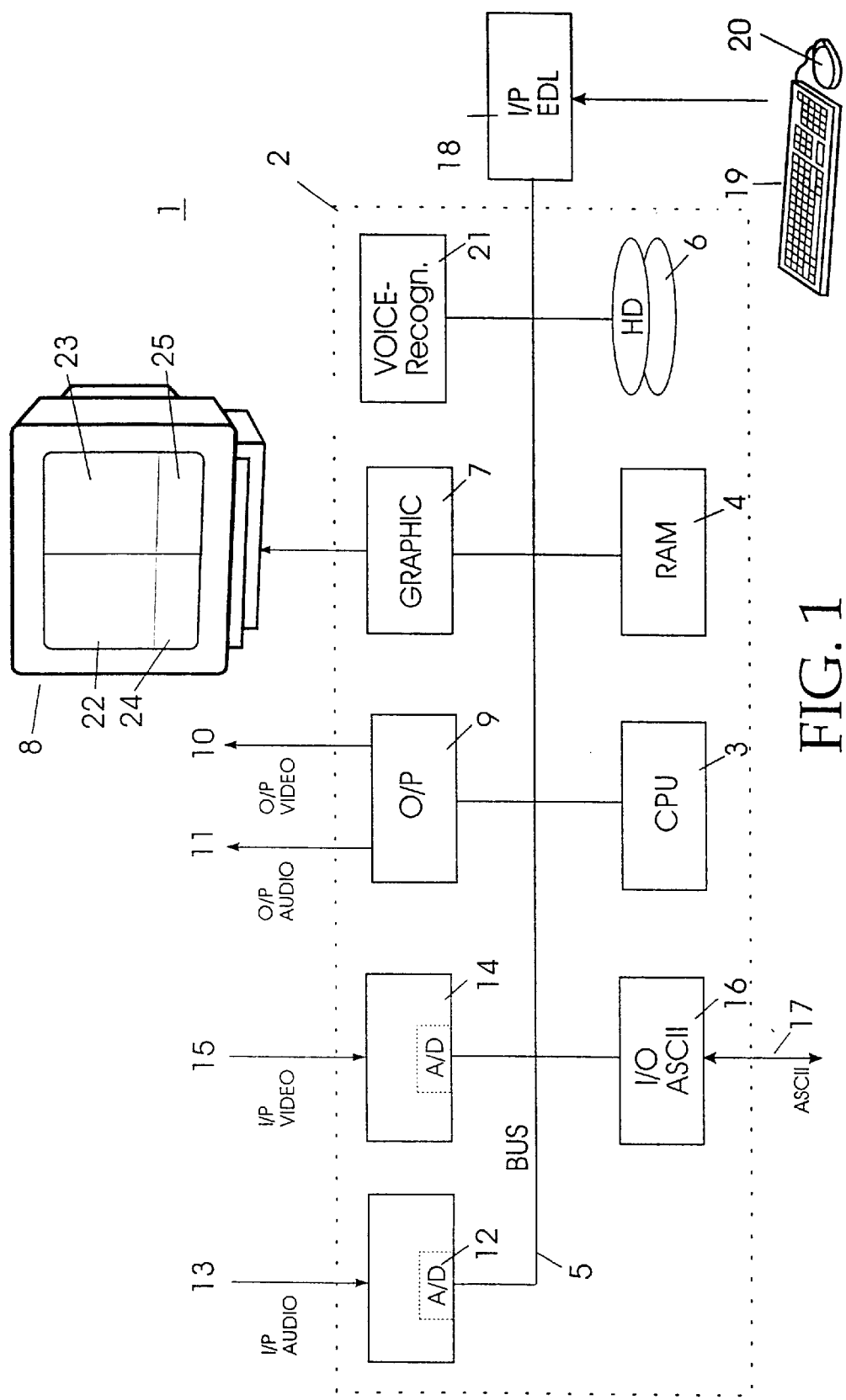
FIG. 1 is a block diagram in accordance with the invention.

In the block diagram shown in FIG. 1, the reference numeral 1 denotes a computer-aided system for editing audio and video signals. The system 1 comprises a computer-aided control device 2 with a CPU (Central Processing Unit) 3 and a RAM (Random Access Memory) 4 which is connected to the CPU 3 via a bus 5. Further connected to the bus 5 are: a non-volatile memory 6, for example a disc memory, a graphic module 7 for controlling a monitor 8, an output module 9 for supplying a video signal from an output and audio signals from an output 11, an audit input module 12 for receiving audio source signals at an input 13, a video input module 14 for receiving a video source signal at an input 15, an input/output module 16 for applying and supplying ASCII character sequence signals via a bidirectional serial bus 17, an input module 18 for receiving data from a keyboard 19 or a mouse 20, and a speech-recognition module 21.

To edit non-linearly, the audio and video source signals at the inputs 13 and 15 are to be written into the non-volatile memory 6 via the input modules 12, 14 and the bus 5. If the audio and video source signals are analog signals, the audio and video source signals are to be A/D converted first. The input modules 12 and 14 include corresponding A/D converters for this purpose.

According to the invention, the audio source signals are to be converted to a character sequence. The conversion is software-controlled in the speech recognition module 21 which defines words in the audio source signals and writes the defined words as a digital character sequence, preferably as an ASCII character sequence, in the non-volatile memory 6. Speech recognition systems are known per se (DE 41 11 781 A1, EP 0 366 192 A2) and are therefore not further described here.

The ASCII character sequence is to be stored in such a way that the time relation between the generated ASCII character sequence and the audio and video source signals is preserved. Since the audio and video source signals are coupled together as a function of time when they are stored via a time code, for example an SMPTE time code, the generated ASCII character sequence corresponds, as a function of time, to the audio and video source signals under this condition. If the ASCII character sequence is read from the memory 6 and displayed as a text on the screen of the monitor 8 while using the graphic module 7, a given time code value can be assigned to each word of the text. Via this time code value, the word-assigned individual image oi the video signal or the associated part of the audio signal can be accessed.

The ASCII character sequence generated by the speech recognition module 21 may not only be used for realizing an EDL, i.e. for editing. The generated ASCII character sequence may also be applied via the serial bus 17 of the input/output module 16 to external apparatuses (not shown) such as, for example a printer, an apparatus for further processing the ASCII character sequence, a server or a teleprompter.

External ASCII character sequences may also be applied to the editing system 1 via the serial bus 17 of the input/output module 16. The supply of external ASCII character sequences is sensible when, for example foreign television news contributions are to be commented upon from a text to be read by a speaker. Moreover, the input of an ASCII character sequence is indicated when a foreign news contribution comprises a spoken text as the sound accompanying the received image material, but in a language which is not commonly used. In this case, a translation of the received news contribution must first be made before it is broadcast. Since it is nowadays possible to make computer-aided translations, it is appropriate to directly apply a translation generated as an ASCII data file from an output of the computer via the serial bus 17 to the input/output module 16 and display it as a text on the screen of the monitor 8.

Due to translations of foreign-language audio material, the lip-synchronicity and hence the original time relation with respect to the received video source material is usually lost. Since both the translated text and the individual images which are more or less appropriate to the translated text are displayed on the screen of the monitor 8, the synchronicity between the audio and video source signals can be restored by eliminating the time-coupling of the translation in the form of an ASCII character sequence and the received video source signal, as well as by performing subsequent editing operations such as erasures, inserts or substitutes of given words in the displayed text. The synchronicity can be advantageously checked by comparing the displayed text with the associated image sequence. When, after editing the displayed text, or also after editing individual images in the image sequence, the text fits the image sequence with respect to time, the time-coupling is restored again and a start can be made with an EDL on the basis of the remaining translated text.

Figure 2:
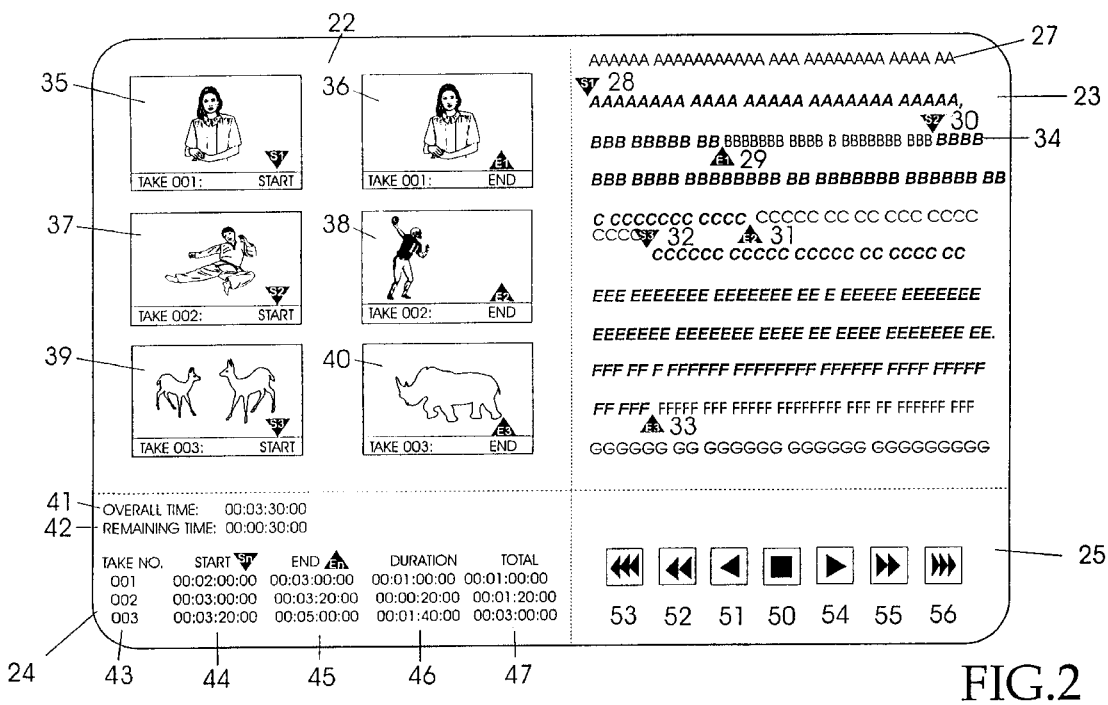
FIG. 2 is a graphic user interface for realizing an edit decision list in accordance with the invention.

FIG. 2 shows a graphic user interface for display on the screen of the monitor 8. The graphic user interface is divided into four areas, an image area 22, a text area 23, an EDL area 24 and a control area 25. The text 27 generated by the speech recognition module 21 is displayed in the text area 23. Dependent on the size of the generated text, the overall text or only a part of the text can be displayed in the text area 23. By scrolling up and down the text, given text parts can be selected for display on the screen. To define an edit start and/or edit end on the basis of the text, parts of the displayed text can be marked. This can be done, for example by placing optical marks at the start and the end of the part of the text used for the broadcast. The start (START S1) of a take 001 can be defined, for example by a mark 28 and the end (END E1) of the take can be defined by a mark 29. The start marks 30, 32 and the end marks 31, 33 bound the subsequent takes 002 and 003.

Another possibility of marking the text is to accentuate the part of the text by means of a bright bar 34. The position and length of the bright bar 34 can be defined by means of the mouse 20 or by controlling the cursor via the keyboard 19.

It is of course also possible to accentuate the desired text both by marking and by bright bars with respect to those parts of the text which are not to be included in the EDL. Further possibilities are to underline desired text passages or to exclude them by means of changed script fonts from those text passages which are not to be broadcast.

A touch screen-controlled monitor 8 can be used very advantageously for displaying text passages as a means for drawing up an EDL. Text lines which are displayed in the text area 23 of the display screen and which, as a function of time, are to be broadcast in the form of desired video and audio information are fingertip-touched.

The image area 22 comprises windows 35 to 40 for displaying images at the start and the end of the takes 001 to 003 selected by the marked text parts. The window 35 shows an individual image of the video information stored in the memory 6, which, with respect to time, is assigned to the position of the start mark 28 of take 001. The window 36 shows an individual image assigned to the position of the end mark 29. This is possible because the continuing text displayed in the text area 23 corresponds via the time code to images of the stored video information. By shifting the position of an editing mark in the text area 23, the associated image at the editing position in the image area 22 can be retrieved from the memory 6 by way of its combination with the time code and displayed as a stationary image by way of intermediate storage in the random access memory 4 and repeated read-out.

The EDL area 24 is used for indicating different time code values and editing instants. The overall time is indicated in line 41 presented by a video director for the ready-made TV contribution. The line 42 denotes the remaining time, i.e. the difference between the overall time and the sum of the duration of takes which have already been selected. Moreover, the EDL area 24 comprises some information about the selected takes. A column 43 indicates the numbers of the takes, a column 44 indicates the time code values at the positions of the start marks 28, 30, 32, a column 45 indicates the time code values at the positions of the end marks 29, 31, 33, and a column 46 indicates the duration of the individual takes. A column 47 indicates total periods of time of the takes so as to obtain information on how much time has hitherto been accumulated for the selected takes. The time code values in the columns 44 and 45 correspond to those in 28 to 33.

In contrast to the prior art, in which the individual time code values are to be determined first and then entered into a computer by means of a keyboard 19, the time code values at the positions of the marks can be automatically taken over in the EDL of the EDL area 24 by setting the marks or by marking parts of the text in accordance with the invention.

The control area 25 comprises several buttons for controlling different functions so as to simplify and speed up the operation of marking the text. The button 50 denotes a stop function: a text scroll is interrupted. By means of a mouse click on the button 54, the editing system can be set to a standard operation at which the text is run through. A click on the button 55 switches the system to a rapid, visible text pre-run. With a click on the button 56, the system jumps to the start of the source material stored in the random access memory 6. The text can be visibly rewound by clicking the button 51 and rewound fast by clicking the button 52, and with a click on the button 53, the system jumps to the end of the text source material stored in the random access memory 6.

The editing system according to the invention is implemented in such a way that, in addition to associated images, also the associated sound is reproduced when the text is run through or when a mark in the text lines is encountered.

If the EDL and hence the editing sequence of the video and audio information to be broadcast is fixed, the random access memory 6 can be read on-line by EDL control in the sense of a non-linear editing operation, and the contribution can be broadcast.

What is claimed is:

1. A system for editing digital video and audio information, comprising:

storage means for recording and reproducing video and audio information, means for producing an edit decision list including editing data, control means for controlling the storage means depending upon the editing data of the edit decision list, means for recognizing speech in the audio information and for generating an ASCII character sequence, which corresponds to the speech as a function of time, for display on a display screen, means for displaying indicators corresponding to parts of the character sequence and associating said indicators with the character sequence on the display screen, and means for deriving editing data with reference to said indicators.

2. The system of claim 1, in which said indicators define limits of parts of the character sequence so as to fix an edit start and/or edit end.

3. The system in claim 1 in which:

the system further comprises means for fixing the position of the limits of the indicated parts of the character sequence displayed on the display screen, and the system further comprises means for converting the position of the limits of the indicated parts to time code data assigned to the video and audio information and for taking over the time code data as editing data in the edit decision list.

4. The system of claim 1, in which the display screen of the indicator means is adapted to be touched to fix the position limits of given parts in the displayed character sequence.

5. The system of claim 1, in which the speech-recognition means includes a device for recognizing different voices in the spoken audio information, which device assigns a given character font to each voice so as to distinguish it from other voices.

6. The system of claim 1, in which in addition to characters of the generated character sequence, the characters of temporarily assigned images of the stored video information are also displayed on the display screen.

7. The system of claim 6, in which a plurality of single images of the stored video information is displayed on the display screen, whose time code data correspond, as a function of time, to time code data at the limits of the indicated parts of the displayed character sequence so as to define the edit starts and/or edit ends of selected takes.

8. The system of claim 1, in which:

marks defining limits of parts of the character sequence are displayed on the display screen so as to fix an edit start and/or edit end, the system further comprises means for fixing the position of the limits of the marked parts of the character sequence displayed on the display screen, the system further comprises means for converting the position of the limits of the indicated parts to time code data assigned to the video and audio information and for taking over the time code data as editing data in the edit decision list, the display screen is adapted to be touched to fix the position limits of given parts in the displayed character sequence, the speech recognition means includes a device for recognizing different voices in the spoken audio information, which device assigns a given character font to each voice so as to distinguish it from other voices, in addition to characters of the generated character sequence, the characters of temporarily assigned images of the stored video information are also displayed on the display screen, and a plurality of single images of the stored video information is displayed on the display screen, whose time code data correspond, as a function of time, to time code data at the limits of the indicated parts of the displayed character sequence so as to define the edit starts and/or edit ends of selected takes.

9. Apparatus for programming a computer system: comprising:

first programmed means for providing apparatus for indicating information;

second programmed means for providing apparatus for producing an edit decision list including editing data;

third programmed means for providing apparatus for controlling storage means of the computer system depending on the editing data of the edit decision list;

fourth programmed means for providing apparatus for recognizing speech in the audio information and for generating an ASCII character sequence, which corresponds to the speech as a function of time, for display on a display screen of the indicating apparatus;

fifth programmed means for displaying indicators corresponding to parts of the character sequence and associating said indicators with the character sequence on the display screen; and sixth programmed means for providing apparatus for deriving editing data with reference to marked parts of the character sequence displayed on the display screen of the indicating apparatus.

* * * * *